Jan. 17, 1967 H. MAYLANDT 3,298,864
SEMI-CONDUCTING COATING FOR USE IN A SELF-HEALING
ALTERNATING VOLTAGE CAPACITOR AND METHOD
Filed Aug. 3, 1965
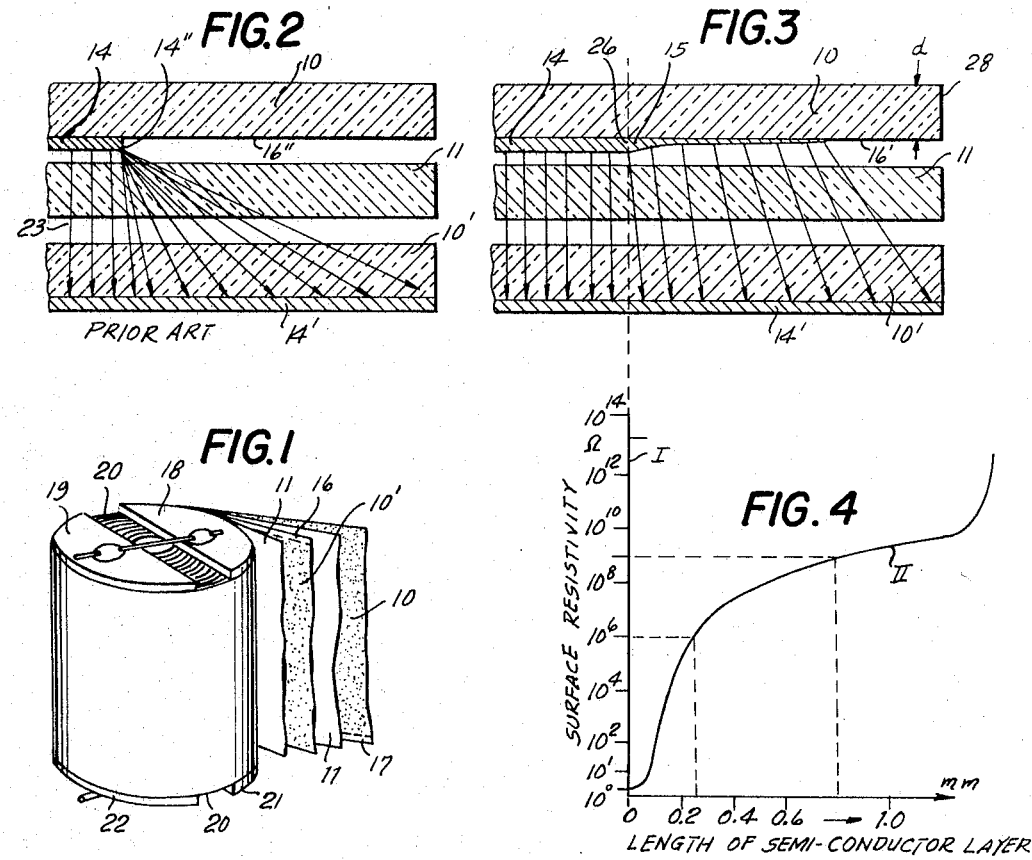
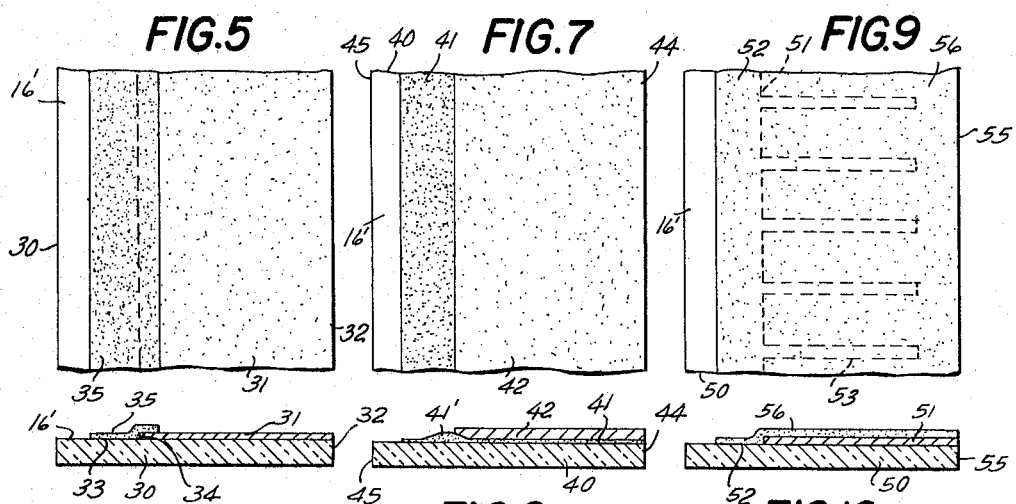
INVENTOR.
Helmut Maylandt
BY
Michael J. Striker
Atty.

United States Patent Office 3,298,864
Patented Jan. 17, 1967

3,298,864
SEMI-CONDUCTING COATING FOR USE IN A SELF-HEALING ALTERNATING VOLTAGE CAPACITOR AND METHOD
Helmut Maylandt, Plochingen am Neckar, Germany, assignor to Firma Robert Bosch G.m.b.H., Stuttgart, Germany
Filed Aug. 3, 1965, Ser. No. 476,947
Claims priority, application Germany, Oct. 7, 1960, B 59,669
16 Claims. (Cl. 117—212)

The present application is a continuation-in-part application of application Serial No. 142,567, filed October 3, 1961 and now abandoned.

The present invention concerns self-healing capacitors, particularly those operated at voltages above 350 volts and preferably of the type which comprises coiled strips of insulating material a portion of the surface whereof is provided with a metal coating while leaving certain surface portions free of such metal coating.

Conventional capacitors of the above described type display surface areas without a metal coating on the strips of insulating material for instance along a marginal zone opposite to that strip edge where the metal coating is connected to a terminal, or there where the metal layer is not entirely continuous but subdivided by transverse slots. It can hardly be avoided that the above mentioned metal layers or coatings terminate in a sharp, practically rectangular shoulder which defines the boundary between the metal coated surface portion of the insulating strip and the metal-free zone or area thereof. It has been found, however, that the sharply defined shoulders or edges of the metal layers cause, in the presence of high voltage stresses applied to the dielectric or insulating material, particularly in the case of alternating voltage capacitors impregnated with liquid insulating materials, dangerous glow discharges whereby the service life of the capacitors is greatly reduced.

Extended experiments have shown that this danger is particularly great in the case of self-healing capacitors because in this type of capacitors the metal layers are usually applied by vapor deposition resulting in the abovementioned sharp shoulders or edges which in turn entail a particularly high field strength concentration at the sharp corner of the edge. Consequently, the appearance of glow discharges must be expected in the first place at these sharp edges. At potentials of 600–800 volts the field strength along the edge of the metal layer is of the order of at least $10^6$ volts/cm. and thus so great the electrons emerge from the metal layer in the direction of the surface of the insulating strip and are accelerated to such a degree that their impact on molecules of the oil used as impregnating medium causes the latter to glow and ionizes the same. When the voltage rises, the impregnating medium decomposes under the liberation of gas and the intensity of the glow discharge finally increases abruptly to such a degree that the capacitor is destroyed in a short time.

A rounded or unsharp edge of the metal layer or covering of a self-healing condenser causes an undesirable increase in the loss factor.

It is known in the high voltage art to reduce the field-strength concentration at the critical points by increasing the dielectric, thereby eliminating insulation breakdown. It is also known to reduce the field-strength concentration at the edges of metal foils utilized as capacitor layers by semi-conductive layers of rubber and carbon black having a resistance of the order of $10^8$ ohm/cm. However, it is obvious that such layers cannot be used for capacitors with metal foils as layers because of their considerable thickness, and that they most certainly cannot be used in self-healing capacitors whose metal layers are deposited on insulating foils and are so thin that when insulation breakdown occurs they burn off around the breakdown point.

Another known solution proposes the use of shaped insulating foils with which a metal layer is so united that a structure of identical thickness throughout is created from a shaped insulating foil and a metal layer and in which the edge of the metal layer does not extend beyond the surface of the insulating foil. This solution is technically impossible because shaped insulating foils of the aforementioned type cannot be manufactured. This will be immediately obvious if it is considered that metal foils which are used as capacitor layers have a thickness of approximately 6 microns and the insulating foils to be wound with them have a thickness of, for example, 8 to 10 microns. It is therefore impossible to reduce the insulating foils by the thickness of the metal foils. This solution is, of course, even more impossible for self-healing capacitors whose metal layers or coverings have a thickness of about .02 to .05 micron.

The principal object of the present invention is to provide a new and improved self-healing capacitor.

An object of the present invention is to provide a self-healing capacitor which prevents glow discharges at the edges of the metal layers and also prevents an undesirable increase in the loss factor.

Another object of the present invention is to provide a self-healing capacitor which is free of the disadvantages of known types.

It is another object of this invention to provide for a capacitor of the type set forth which is simple and comparatively inexpensive in production.

The construction of the self-healing capacitor according to the invention is based on the finding that the danger of destruction or damage of the capacitor by the above described phenomena can be safely avoided if one is able to prevent an excessive field concentration along the edges of the metal layer and to arrange matters so that the work function of the electrons tending to emerge from the metal layer is as high as possible.

In view of the above, the invention provides in a self-healing capacitor, particularly for operation at voltages above 350 volts, in combination, at least one sheet member of dielectric material having a predetermined surface area, a first layer of metal coating applied to one face of the sheet member and covering a first portion of the surface area so as to have at least one edge defining the boundary between the metal coated first portion of the surface area and a second portion thereof being free of the metal coating, and a second layer of semi-conductor material applied at least to a portion of the second portion of the surface area and immediately adjacent to the edge.

In particular, where the first layer of metal coating is applied as a strip, and likewise the second layer of semi-conductor material is applied as a strip adjacent to the edge of the metal coating strip, the desired result is obtained when said strip of semi-conductor material has a width of at least .008″ and up to 2% of the width of the strip of metal coating, and a surface resistivity of at least $10^6$ ohms. The strip of semi-conductor material may also extend into the area covered by the metal layer and may be located either between the insulating sheet material and the metal layer, or may be located on the outside of the metal layer. The semi-conductor material may be carbon or a semi-conducting metallic substance or a semi-conducting metal oxide and may be applied either before or after the metal coating is applied to the insulating material. In any case, the result of the addition of a layer or strip of semiconductor material consists in causing the field lines which ordinarily would be concentrated along the sharp edges of the metal layers, to be spread through the comparatively highly resistive semi-conductor strip so that within the marginal area occupied by the field lines the concentration thereof is nowhere as close as it would be along a sharply defined boundary edge of the metal layer.

In accordance with the present invention, the semi-conductor layer resistance, which is defined as the specific resistance of a square unit, of the semi-conductor layers, which extend over the edges of the metal layers, is determined in accordance with the frequency $\omega = 2\pi f$ of the applied alternating current, the width $b_s$ of the semi-conductor edge strips, the thickness $d$ of the dielectric, the absolute dielectric constant $\epsilon o$ and the relative dielectric constant $\epsilon r$, and is defined as:

$$R_\square = (10^{-2} \text{ to } 10^0) \frac{d}{\epsilon o \cdot \epsilon r \cdot b_s^2 \cdot \omega}$$

where $R_\square$ is the specific resistance of a square unit, $d$ is the thickness of the dielectric in mm., $\epsilon o$ is the dielectric constant for vacuum or air, $\epsilon r$ is the relative dielectric constant, $b_s$ is the width of the semi-conductor layer in mm. and $\omega$ is $2\pi$ times the applied alternating current frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view of a coiled capacitor comprising metal-coated strips of insulating material according to the invention, some strips being shown in partially uncoiled position;

FIG. 2 is a diagrammatic exploded cross-sectional view of three layers of a conventional capacitor illustrating the distribution of field lines emanating from a sharp edge of a metal layer;

FIG. 3 is a similar diagrammatic exploded cross-sectional view of three layers of a capacitor according to the invention illustrating the effect of a semi-conductor material strip along the edge of the metal layer on the distribution of the field lines;

FIG. 4 is a graph illustrating the distribution of surface resistivity in the marginal zone of capacitors according to FIGS. 2 and 3, respectively, for the purpose of comparison;

FIGS. 5 and 6 are a plan view, and the corresponding cross-section, of a second embodiment of the invention comprising a strip of insulating material provided with a metal layer and with a strip layer of semi-conductor material;

FIGS. 7 and 8 are a similar plan view, and the corresponding cross-section, of a third embodiment of the invention showing an insulating strip provided with a metal layer and with a different type of a strip of semi-conductor material; and FIGS. 9 and 10 are a similar plan view, and the corresponding cross-section, of a further embodiment of the invention showing a strip of insulating material provided with a different type of metal layer and with a different type of a strip of semi-conductor material.

Referring to FIG. 1, it is to be understood that the further illustrated examples of capacitor components refer to a type of coiled capacitor as shown in FIG. 1 in which each convolution comprises two pairs of strips of insulating material, the first pair consisting of a strip 10 provided with a metal layer and a strip 11 without any metal layer, the second pair consisting of another strip 10' provided with a metal layer and another strip 11' having no metal layer thereon. All the aforementioned four strips 10, 11, 10' and 11' have the same width, which is for example, 60 mm.

FIGS. 2 and 3 illustrate in a greatly magnified exploded cross-sectional view, not to scale, only one marginal portion of the above-mentioned strips 10, 11 and 10'. As is well-known, the strips 11 and 11' constitute only intermediate layers between the metal coated strips in order to increase the dielectric strength of the particular convolution. The metal coatings 14 and 14' of the strips 10 and 10', respectively, do not cover the entire surface or width of the respective strips 10 and 10' but terminate at a specified distance from one edge of the respective strip as indicated at 16 and 17 in FIG. 1. These metal-free margins 16 and 17 are arranged at opposite edges of the coiled strips, as shown in FIG. 1.

In conventional manner, the edges of the metal coating on all the convolutions of strip 10 are connected with each other by means of contact plates or terminal members 18, 19 applied to the end 20 of the coiled capacitor, for instance by spraying. In view of the metal-free margin 16, the contact pieces 18, 19 have no contact with the metal coating on the strip 10'. In a similar manner the edges of the metal coating on all the convolutions of the strip 10' are connected with each other by another pair of contact pieces 21, 22 applied to the opposite end 20' of the coiled capacitor. The contact plates 21, 22 are not in contact with the metal coating on the strip 10 on account of the metal-free margin 17 thereof.

To enable comparison, FIG. 2 illustrated conditions characteristic of conventional coiled capacitors of the general aforedescribed type, while FIG. 3 illustrates the characteristics of a capacitor according to the present invention. In FIGS. 2 and 3 the identical reference numerals designate those elements of the structure which are identical in both cases and correspond to the illustration of the capacitor of FIG. 1.

In producing a conventional capacitor according to FIG. 2, the metal coatings or layers 14 and 14' are applied to the respective strips of insulating material 10 and 10' by vapor deposition of zinc vaporized in a vacuum in such a manner that the metal layer, as shown for the layer 14 in FIG. 2, terminates in a sharp shoulder or edge 14" which constitutes the boundary between the surface portion of the strip 10 which is provided with the metal coating or layer 14 and the marginal portion 16" which is free of such a metal coating. As can be seen in FIG. 2, when an electric potential is applied to the capacitor, field lines emanate from the metal layer 14 toward the metal layer 14' but are heavily concentrated at the edge 14". This concentration of field lines causes electrons to emerge from the edge 14" which results in glow discharges likely to damage the capacitor.

In order to avoid this undesirable effect, the invention provides the structure illustrated in FIG. 3. In this case, the metal layer 14 extends from the opposite, not shown, edge of the strip 10 with a substantially uniform thickness of about .07 micron up to the point 26 which to some degree corresponds to the edge 14" of FIG. 2. However, from the point 26 on in direction toward the free edge 23 of the strip 10, the layer 14 continues as a tapered marginal strip 15, as shown. The metal-free marginal zone of the strip 10 is then reduced to the thickness indicated at 16'.

In order to produce the tapered marginal strip portion 15, the following procedure may be followed. The metal may be vaporized in a vaporizing vessel equipped with electrical heating coils and containing a vacuum of about $10^{-1}$ to $10^{-2}$ torr from which a stream of metal vapor is taken and directed at the strip of insulating material. A mask or the like is located across the stream of metal vapor, between the vaporizing vessel and the strip of insulating material, and the mask has an opening which limits the area on which metal will be deposited on the insulating material strip. One edge of the aforementioned opening of the mask may be formed in such a manner that it does not create a sharp edge like that shown at 14" in FIG. 2, but tapers on the side facing the insulating material in such a manner that a wedge-shaped space remains between the mask and the insulating material whereby only comparatively few metal particles are able to penetrate into the space extending from the point 26 toward the marginal zone 16'. In this manner, the tapered layer portion 15 is created. Since the thickness of the layer portion 15 is comparatively very small, as compared with the thickness of the metal layer 14, the tapered layer 15 is converted into zinc oxide by the oxygen contained in the atmosphere up to a certain depth of penetration thereof, as soon as the metal coated strip of insulating material is removed from the vacuum in which the vapor deposition has been carried out. The zinc oxide constitutes a semi-conductor.

Consequently, the tapered marginal portion 15 constituting a strip of semi-conductor material has a surface resistivity which greatly increases from the point 26 toward the edge adjacent the marginal portion 16'. As is well-known, the surface resistivity is the resistance of a square surface portion and can be measured by measuring the resistance between two opposite sides of such square area. The area resistance of the semi-conductor layer 15 is, for example, from $10^6$ to $10^9$ ohms.

FIG. 4 is a graph in which the ordinate indicates surface resistivity while the abscissa indicates the distance of the point 26, which is the starting point of the semi-conductor layer 15, from a point of measuring the surface resistivity, this distance being measured in the direction toward the thin outer edge of the tapered semi-conductor layer 15. The heavy line I of FIG. 4 coinciding with the ordinate, through the zero point of the graph, illustrates symbolically the conditions prevailing in a conventional capacitor structure as shown in FIG. 2, in which case an infinite resistivity prevails immediately at the edge 14″, which edge corresponds to the point 26 of FIG. 3. This infinite resistivity causes the concentration of field lines at the edge 14″ and the emergence of electrons from said edge 14″.

On the other hand, and in strict contrast therewith, the curve II of FIG. 4 indicates the relative increase of surface resistivity at various points distant from the point 26 within the tapered semi-conductor layer 15. As shown in FIG. 4, the surface resistivity of a zinc layer 14 of substantially uniform thickness amounts to about 2 to 4 ohms. However the surface resistivity of the tapered semi-conductor layer 15 increases from that value to substantially greater values with increasing distances of the measuring points from the point 26. Up to a distance of .2 mm. the rise is comparatively steep and the resistivity in the neighborhood of this point amounts to about $10^6$ ohms. From there the rise is less steep and the surface resistivity reaches a value of $10^9$ ohms at a distance of about .8 mm. The resistivity range between the distances .2 mm. and .8 mm. is of particular importance with respect to the desired effect. The curve II rises from $10^9$ ohms to $10^{10}$ ohms less steeply and then rises abruptly to a value greater than $10^{16}$ ohms, which corresponds to the exceedingly low surface conductivity of the insulating foil of the capacitor.

The curve II is for a capacitor operating at 50 cycles per second, utilizing a semi-conductor layer having a width of 0.5 to 1.2 mm. and a resistance between $2 \cdot 10^7$ and $2 \cdot 10^9$ ohms. The metal layer of the capacitor has a width of 120 mm. and an area or surface resistance greater than $10^6$ ohms. Electrons leaving the metal layers are absorbed in the semi-conductor layer without an undesirable increase of the loss factor and with the prevention of glow discharges and simultaneous decomposition of the saturating oil. Tests conducted on a high voltage capacitor with sharply defined metal layer edges indicated a voltage of 4.2 kv. at which glowing began. A similar capacitor, utilizing a semi-conductor layer in accordance with the present invention did not glow at voltages greater than 6 kv. A further increase of the voltage would have destroyed the capacitor for other reasons, for example, thermal overload.

In view of the increasing and rather high resistivity of the tapered layer 15 it is difficult for the electrons to travel from the metal layer 14 of uniform thickness through the tapered layer 15 toward the remote edge of the layer 15 adjacent to the metal-free marginal zone 16'. In addition, due to the smooth transition of the resistivity curve II from the value characteristic of the layer 14 to the increasing values of the layer 15 the field lines near the point 26 and in the area outward thereof are rather evenly distributed, as illustrated in FIG. 3, and the spacing between these field lines may be considered as illustrative of the field strength in said area. Since the occurrence of glow discharges depends upon the existence of a certain minimum field strength, a capacitor structure according to the invention, and as illustrated in FIG. 3, may be subjected to very substantially higher potentials than would be permissible for a conventional capacitor structure as illustrated in FIG. 2. It has been established by experiment that in a conventional capacitor structure according to FIG. 2, glow discharges appear at a potential of 4.2 kv., while with a structure according to the invention, as illustrated in FIG. 3, the potential may be increased beyond 6 kv. without the appearance of any glow discharges.

FIGS. 5 and 6 illustrate by way of example another embodiment of the invention. In the embodiment of FIGS. 5 and 6, a strip of insulating material 30 is provided with a zinc layer 31 applied by vapor deposition and having a thickness of .1 micron which reaches on one side up to the edge 32 of the strip 30. Along the opposite edge of the strip 30, however, the opposite edge 34 of the metal layer 31 is spaced from said other edge of the strip 30 so as to leave a marginal surface portion 33 free of metal deposits. However, in order to avoid field line concentrations, as shown in FIG. 2, which would produce glow discharges along the edge 34, a semi-conductor strip layer 35 is provided. In this case, the semi-conductor material may be carbon which may be applied in the following manner. The carbon is heated in a vacuum by means of an electron beam and is deposited on the strip 30 and partly over an edge portion of the metal layer 31 in such a manner that the carbon layer 35 overlaps the metal layer 31 with a width of about 1 mm. while leaving a marginal strip 16' of about 2 mm. of the insulating strip 30 free of deposit. Under these circumstances, the semi-conductor carbon layer 35 is in good electrically conductive contact with the metal layer 31 and is so thin that it has a surface resistivity of about $10^8$ ohms.

FIGS. 7 and 8 illustrate another example of a capacitor structure according to the invention. In the embodiment of FIGS. 7 and 8, again, an insulating strip 40 having edges 44 and 45 is provided with a vapor deposited metal layer 42 of zinc which reaches from the edge 44 only part way across the surface of the strip 40. A second metal layer 41 is located between the insulator strip 40 and the metal layer 42 and extends from the edge 44 beyond the opposite edge of the metal layer 42 part way across the surface of the strip 40 leaving a metal-free marginal strip 16' along the edge 45. The layer 41 is made of vapor deposited silver. The silver layer 41 is applied in the following manner. A stream of silver vapor is directed from a vaporizing vessel against the surface of the insulating strip 40 through a nozzle which has a slot extending in a direction transverse of the longitudinal direction of the strip 40 and reaching from the edge 44 up to the marginal zone 16'. However in the neighborhood of the zone 16' the width of the slot is gradually reduced to a high degree so that much less silver will be deposited in the area adjacent to the zone 16' as compared with the deposit in the area corresponding to the width of the metal layer 42. However, in order to produce the substantially increased thickness of the silver deposit in the area marked 41' the width of the slot of the nozzle is substantially increased in the respective area.

Of course, the silver deposit is provided first and thereafter the zinc layer 42 is vapor deposited in superposition over the silver layer 41. The silver layer 41 has a double function. One purpose of the application of the silver layer 41 is to cause a better adherence of the zinc layer 42. The second purpose is the production of a semi-conductor transition strip similar to the tapered layer 15 of FIG. 3. The zinc layer 42 may have a thickness of .07 mm. and is applied with the desired width by means of a mask covering the margin where no zinc deposit is desired. The thickness of the silver layer 41 is considerably less than that of the zinc layer 42. It will be understood that after the completion of the vapor depositing operations that portion of the silver deposit 41 which projects beyond the free edge of the zinc layer 42 and which is now exposed to the atmosphere undergoes oxidation. Silver oxide is a semi-conductor. Due to this oxidation, the surface resistivity of the silver layer 41 in the marginal area between the zinc deposit 42 and the zone 16' is very high and amounts at a distance of about 2.5 mm. from the edge 45 to $10^6$ ohms.

In the further example of an embodiment of the invention, as illustrated in FIGS. 9 and 10, a strip of insulating material 50 is provided with a zinc layer 51 vapor deposited directly on the insulating material 50 starting from the edge 55 and reaching part way across the width of the strip 50. The metal layer 51 may have a thickness of .1 micron. In this case, the metal layer 51 is provided in a well-known manner with transverse slots 53 subdividing the strip 51 in longitudinal direction into comparatively short area portions connected with each other only by a comparatively narrow continuous strip of metal along the edge 55. The slots 53 constitute therefor also metal-free surface portions of the insulating material 50. A construction of the metal layer of this type is advisable if the capacitor is to be operated at potentials above 500 volts, because under such circumstances a breakdown between an area portion of the illustrated strip is prevented from causing arcs of any appreciable strength.

In order to prevent the field concentrations, illustrated in FIG. 2, along the edges of the metal layer 51 constituting the boundary between the metal coated surface and the metal-free surface of the insulating strip 50, a semi-conductor layer 56 according to the invention is vapor deposited over the metal layer 51 starting also from the edge 55 and extending at 52 beyond the free edge of the metal layer 51, leaving, however, again a metal-free margin 16'. The marginal zone 16' may have a width of 3 mm. The semi-conductor layer 56 may consist in this case of a silicon compound. The thickness of the semi-conductor layer 56 is chosen to result in a surface resistivity thereof amounting to about $10^8$ to $10^9$ ohms. It is advisable to keep this surface resistivity within this range because if it were smaller the danger would exist that, on one hand, the decoupling effect of the metal-free transverse zones or slots 53 would be reduced and, on the other hand, the loss angle of the completely assembled capacitor would be unduly increased.

It should be understood that semi-conducting metal oxide layers can be produced either by the admission of air after the vapor deposition of the basic metal, or by the introduction of oxygen into the vacuum vessel during the vapor deposition process.

The present invention is based on the realization that the resistance of the semi-conductor layer is approximately as large as the resistance of a layer of a capacitor whose capacitance falls appreciably below the capacitance of a layer with a normal resistance of from 2 to 10 ohms. In this case, for example, the relation of the imaginary part to the real part of the complex resistance of the semi-conductor layer is $\geq 0.3$. Thus, the resistance of the semi-conductor layer is determined by the thickness of the dielectric or insulating material of the capacitor or the operating voltage of the capacitor, the dielectric constant of the insulating material of the capacitor, and the frequency of operation of the capacitor. The factor $10^{-2}$ to $10^0$ allows for manufacturing tolerances which occur during manufacturing of the semi-conductor layers by vapor deposition and is generally between 0.50 and 0.25.

For a 380 volt alternating current capacitor with the usual operating field strength of approximately 140 kv./cm., the following resistance values are found when a dielectric of .027 mm. thickness and a semi-conductor layer of 1.0 mm. width are utilized:

| Frequency of Alternating Current in Cycles per Second | $10^1$ | $10^2$ | $10^3$ | $10^4$ | $10^5$ | $10^6$ |
|---|---|---|---|---|---|---|
| Resistance of Semi-Conductor Layer in Ohms | $10^8$–$10^{10}$ | $10^7$–$10^9$ | $10^6$–$10^8$ | $10^5$–$10^7$ | $10^4$–$10^6$ | $10^3$–$10^5$ |

The most advantageous effect is provided at a minimum width $b_s$ of the semi-conductor layer of approximately $10d$ or ten times the thickness of the dielectric. The desirable effect is not adversely affected by greater widths. However, a maximum width of the semi-conductor layer is determined by a consideration of the increase of the loss factor of the entire capacitor which may ensue from the use of semi-conductor layers. The following factors must be taken into consideration:

The losses $\tan \delta_B$ of the semi-conductor layer are approximately $$\tan \delta_B \approx 2/3 \cdot \epsilon_0 \cdot \epsilon_r \frac{b_s^2}{d} \omega \cdot R_\Box$$

Since the layers of the capacitor are not of high resistance over their entire width, but have semi-conductor layers only at their borders, the actual loss factor $\tan \delta$, when there is a parallel connection of a capacitance having a layer width $b_1$ with normal dielectric losses $\tan \delta_d$ and a capacitance having a semi-conductor layer having a width $b_s$, that is with losses $\tan \delta_B$ is thus $$\tan \delta \approx \frac{b \cdot \tan \delta_d + b_s \cdot \tan \delta_B}{b_1 + b_s}$$

If an increase in the total loss factor by the amount $\Delta \tan \delta$ is permissible when semi-conductor layers are utilized, the width $b_s$ of the semi-conductor layer, taking into consideration the definition of $\tan \delta_B$ and its mathematical formulation and utilizing a median resistance for the semi-conductor layer of $$R_\Box = 10^{-1} \cdot \frac{d}{\epsilon_0 \cdot \epsilon_r \cdot b_s^2 \cdot \omega}$$

may not exceed the value $$b_s = b_1 \frac{15 \Delta \tan \delta}{1 - 15 \tan} \approx b_1 \cdot 15 \Delta \tan \delta$$

wherein $\Delta \tan \delta$ is the permissible increase of the loss factor over a loss factor which is present without semi-conductor layers and $b_1$ is the width of the layers of the capacitor in mm.

The permissible increase in the loss factor of the capacitor of the present invention depends upon characteristics of construction, such as capacitor quality and quality of the heat conduction to the housing. In general, it will be smaller, the larger the capacitor unit. In case the loss factor of the capacitor of the present invention rises by 5, 10 or 20% above the values of .004 which are customary without the utilization of semi-conductor layers, the following table of maximum width of the semi-conductor layer at various widths $b_1$ of the layers of the capacitor results for the aforementioned 380 volt capacitor with a dielectric thickness of .027 mm.

| Width $b_1$ of Capacitor Layer in mm. | | 20 | 60 | 120 |
|---|---|---|---|---|
| Width $b_s$ of semi-conductor layer in mm. | $\Delta \tan \delta = 5\%$ | (0.06) | (0.18) | 0.35 |
| | $\Delta \tan \delta = 10\%$ | (0.12) | 9.35 | 0.7 |
| | $\Delta \tan \delta = 20\%$ | (0.24) | (0.70) | 1.4 |

Since the width $b_s$ of the semi-conductor layers should be at least ten times the thickness of the dielectric, the widths $b_1$ of the capacitor layer which lead to the values of $b_s$ which are shown in parentheses, are not usable for a capacitor of the present invention.

A technically usable alternating current capacitor with increased glow resistance at the edges of the metal layers may thus be provided only if the semi-conductor layers have a predetermined resistance and a width which takes into account the thickness and the dielectric constant of the dielectric of the capacitor, and which also takes into account the frequency of the alternating current at which the capacitor operates.

The effect attained by the invention particularly with semi-conducting metallic layers is essentially based on the fact that the layer elements of, for example, the semi-conductor layer 15 of FIG. 3 become less and less capable of carrying capacity as they are located farther away from the edge 14″ and closer to the free outer edge of the layer 15, because due to the taper the semi-conductor material gradually loses the characteristic of being a continuous and coherent layer. It is therefore to be understood that in this specification and in the claims the word "layer" is not necessarily limited to a coherent and continuous layer of metallic material but includes also an arrangement of more or less closely adjacent particles of the metallic material. Due to the aforedescribed specific structure of the semi-conductor strip or layer 15, the work function of the electrons tending to emerge from this layer is greatly increased. However, this can be increased even more and to a very substantial degree if, for the production of the semi-conductor strip, materials are used which have in their compact condition a characteristic electron work function which is larger than that of the usual metals used for the metal layers of capacitors such as, for example, zinc. Such preferable materials are, for instance, selenium, silicon, nickel, cadmium, silver chloride and tungsten oxide. Since the oxides of aluminum and magnesium are non-conductive, aluminum and magnesium are not suitable.

In predetermining the desirable width of the semi-conductor strip arranged adjacent to the edge of the metal layers it must be taken into account that fundamentally the loss factor of a capacitor is increased if the edges of the metal layers are not sharply defined. It has been found by experimentation that, for instance, in the case of a semi-conductor strip having a surface resistivity of $10^8$ ohms as hereinbefore defined, and having a width of 2% of the width of the metal layer strip, the loss factor increases by 10% of the normal dielectric losses. Therefore, a greater width for the semi-conductor strip is not advisable.

On the other hand, as aforementioned, for obtaining the desired effect, the semi-conductor strip should have a minimum width equal to ten times the thickness of the dielectric or insulating material used in the capacitor. This is based on the fact that, for instance, the dielectric strength of an insulating oil amounts to about one tenth of the dielectric strength of a dielectric material impregnated with such insulating oil. This means that if the electric load of a capacitor is increased up to the dielectric strength of the impregnated dielectric material, a layer of oil of ten times the thickness of the dielectric material would break down at the corresponding voltage. Now it can be seen that the electrons accelerated in direction away from a sharp metal layer edge constitute nothing else but an electric load on the insulating oil in the meaning of the foregoing statements. Since, however, it is desired that the electrons emerging from the metal layer edge should, so-to-say, die while tending to travel through the semi-conductor strip extending along the metal layer edge, the width of the semi-conductor strip must be substantially greater than the thickness of the dielectric material.

It can be seen from the above, that by the application of a semi-conductor strip in accordance with the invention, the critical voltage which would cause the start of a glow discharge is shifted into a range of so high a potential which by no means would be permissible in practice in view of other factors limiting the load applicable to the dielectric material.

In the definition of the specific resistance $R_\square$ of a square unit of the semi-conductor layer by mathematical formulation as $$R_\square = (10^{-2} \text{ to } 10^0) \frac{d}{\epsilon_0 \cdot \epsilon_r \cdot b_s^2 \cdot \omega}$$

the multiplying factor ($10^{-2}$ to $10^0$) may have a value $0.1 \pm 0.025$. $R_\square$ is the specific resistance of a square unit and is therefore independent of the length of the layer. R equals $\rho l/b$, where $\rho$ is the specific resistance, $l$ is the length of the area measured and $b$ is the width of the area measured. Thus, for the specific resistance of a square unit $l/b$ equals 1 so that $R_\square$ equal $\rho$.

The absolute dielectric constant $\epsilon = \epsilon_0 \cdot \epsilon_r$, wherein $\epsilon_0$ is the dielectric constant for vacuum or air and $$\epsilon_0 = 0.885 \times 10^{-13} \text{ f./cm.}$$

$\epsilon_r$ is the relative dielectric constant which indicates how many times the absolute dielectric constant of any material is larger than that of air. The relative dielectric constant of air is 1, of oil impregnated paper is 4.8, of plastic dielectric Mylar is 3.0 and of plastic dielectric Polystyrol or Polypropylene is 2.2.

It will be understood that each of the aforedescribed elements, or two or more together, may also find a useful application in other types of self-healing capacitors differing from the types described above.

While the invention has been illustrated and described as embodied in a self-healing capacitor provided with metal layers on a dielectric sheet member and additionally with a layer of semi-conductor material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a self-healing alternating voltage capacitor,
   a sheet member of dielectric material having a determined thickness and a determined surface area;
   a first metal layer on a face of said sheet member covering a first portion of the surface area of said sheet member and having an edge forming a boundary between the first portion of said surface area and a second portion of said surface area free of said first metal layer; and a second layer of semi-conductor material on a part of said second portion of the surface area of said sheet member next adjacent the edge of said first metal layer, said layer of semi-conducting material having a determined width and a specific resistance per square unit $$R_\square = K \frac{d}{\epsilon_0 \cdot \epsilon_r \cdot b_s^2 \cdot \omega}$$

wherein K is a constant having a magnitude in the range $10^{-2}$ to $10^0$, $d$ is the thickness of said sheet member in mm., $\epsilon_0$ is the dielectric constant for air, $\epsilon_r$ is the relative dielectric constant of said dielectric material, $b_s$ is the width of the layer of semi-conductor material in mm. and $\omega$ is $2\pi$ times the frequency of the alternating voltage at which said capacitor operates in cycles per second.

2. In a self-healing alternating voltage capacitor as claimed in claim 1, wherein the width of said layer of semi-conductor material is at least ten times greater than the thickness of said sheet member.

3. In a self-healing alternating voltage capacitor as claimed in claim 1, wherein said first metal layer comprises a metal from the group of metals whose oxides are semi-conductive and wherein said semi-conductor material is produced from the same metal.

4. In a self-healing alternating voltage capacitor as claimed in claim 1, wherein said semi-conductor material comprises a metal from a group consisting of carbon and semi-conducting metal substances.

5. In a self-healing alternating voltage capacitor as claimed in claim 1, wherein said semi-conductor material comprises a metal from a group consisting of carbon and semi-conducting metal oxides.

6. In a self-healing alternating voltage capacitor as claimed in claim 1, wherein said semi-conductor material comprises a metal oxide.

7. In a self-healing alternating voltage capacitor as claimed in claim 1, wherein said semi-conductor material comprises carbon.

8. In a self-healing alternating voltage capacitor as claimed in claim 1, wherein said metal layer has a determined width and said layer of semi-conductor material covers the width of said metal layer.

9. In a self-healing alternating voltage capacitor as claimed in claim 1, wherein said metal layer has a determined width and said layer of semi-conductor material has a thickness substantially equal to that of said metal layer next adjacent the edge thereof and tapering downward away from said edge.

10. In a self-healing alternating voltage capacitor as claimed in claim 1, wherein said layer of semi-conductor material extends under said metal layer and into the surface area of said sheet member free of said metal layer.

11. In a self-healing alternating voltage capacitor as claimed in claim 1, wherein said layer of semi-conductor material extends over said metal layer and into the surface area of said sheet member free of said metal layer.

12. In a self-healing alternating voltage capacitor as claimed in claim 1, wherein said capacitor has dielectric losses greater by a value $\Delta \tan \delta$ than dielectric losses of said capacitor excluding said layer of semi-conductor material, said metal layer has a determined width, and the width of said layer of semi-conductor material is equal to or less than the magnitude $15\, b_1 \cdot \Delta \tan \delta$, wherein $b_1$ is the width of said metal layer.

13. In a self-healing alternating voltage capacitor for operation at voltages above 350 volts, at least one sheet member of dielectric material having a determined surface area, said dielectric material having a thickness in a range of approximately .02 to .1 mm.;

a first layer of metal coating applied to one face of said sheet member as a strip and covering a first portion of said surface area so as to have at least one edge defining a boundary between said metal coated first portion of said surface area and a second portion thereof free of said metal coating; and a second layer of semi-conductor material applied as a strip to a portion of said second portion of said surface area and immediately adjacent said edge, said strip of semi-conductor material having a width in a range of approximately .02 to 0.1 mm. and up to 2% of the width of said strip of said first layer of metal coating and a surface resistivity in a range of approximately $10^6$ to $10^9$ ohms.

14. In a method of preparing a self-healing alternating voltage capacitor, the steps of coating on a sheet member of dielectric material having a determined thickness and a determined surface area a first metal layer on a face of said sheet member covering a first portion of the surface area of said sheet member and having an edge forming a boundary between the first portion of said surface area and a second portion of said surface area free of said first metal layer; and coating on a part of said second portion of the surface area of said sheet member next adjacent the edge of said first metal layer a second layer of semi-conductor material having a specific resistance per square unit $$R_\square = K \frac{d}{\epsilon_0 \cdot \epsilon_r \cdot b_s^2 \cdot \omega}$$

wherein K is a constant having a magnitude in the range $10^{-2}$ to $10^0$, $d$ is the thickness of said sheet member in mm., $\epsilon_0$ is the dielectric constant for air, $\epsilon_r$ is the relative dielectric constant of said dielectric material, $b_s$ is the width of the layer of semi-conductor material in mm. and $\omega$ is $2\pi$ times the frequency of the alternating voltage at which said capacitor operates in cycles per second.

15. In a method of preparing a self-healing alternating voltage capacitor, the steps of first coating on a sheet of dielectric material having a determined thickness and a determined surface area a first metal layer on a face of said sheet member covering a first portion of the surface area of said sheet member and having an edge forming a boundary between the first portion of said surface area and a second portion of said surface area free of said first metal layer; and next coating on a part of said second portion of the surface area of said sheet member next adjacent the edge of said first metal layer a second layer of semi-conductor material having a specific resistance per square unit $$R_\square = K \frac{d}{\epsilon_0 \cdot \epsilon_r \cdot b_s^2 \cdot \omega}$$

wherein K is a constant having a magnitude in the range $10^{-2}$ to $10^0$, $d$ is the thickness of said sheet member in mm., $\epsilon_0$ is the dielectric constant for air, $\epsilon_r$ is the relative dielectric constant of said dielectric material, $b_s$ is the width of the layer of semi-conductor material in mm. and $\omega$ is $2\pi$ times the frequency of the alternating voltage at which said capacitor operates in cycles per second.

16. In a method of preparing a self-healing alternating voltage capacitor, the steps of coating in vacuum on a sheet of dielectric material having a determined thickness and a determined surface area a first metal layer on a face of said sheet member covering a first portion of the surface area of said sheet member and having an edge forming a boundary between the first portion of said surface area and a second portion of said surface area free of said first metal layer; and coating in the same operation on a part of said second portion of the surface area of said sheet member next adjacent the edge of said first metal layer a second layer of semi-conductor material having a specific resistance per square unit.

$$R_\square = K \frac{d}{\epsilon_0 \cdot \epsilon_r \cdot b_s^2 \cdot \omega}$$

wherein K is a constant having a magnitude in the range $10^{-2}$ to $10^0$, $d$ is the thickness of said sheet member in mm., $\epsilon_0$ is the dielectric constant for air, $\epsilon_r$ is the relative dielectric constant of said dielectric material, $b_s$ is the width of the layer of semi-conductor material in mm. and $\omega$ is $2\pi$ times the frequency of the alternating voltage at which said capacitor operates in cycles per second.

References Cited by the Examiner

FOREIGN PATENTS 746,287 6/1944 Germany.

RALPH S. KENDALL, *Primary Examiner.*

W. L. JARVIS, *Assistant Examiner.*